Aug. 10, 1926.

H. FRIESS 1,595,183

CINEMATOGRAPHIC PHOTOGRAPHING AND PROJECTION APPARATUS

Filed Oct. 28, 1924   2 Sheets-Sheet 1

Inventor:

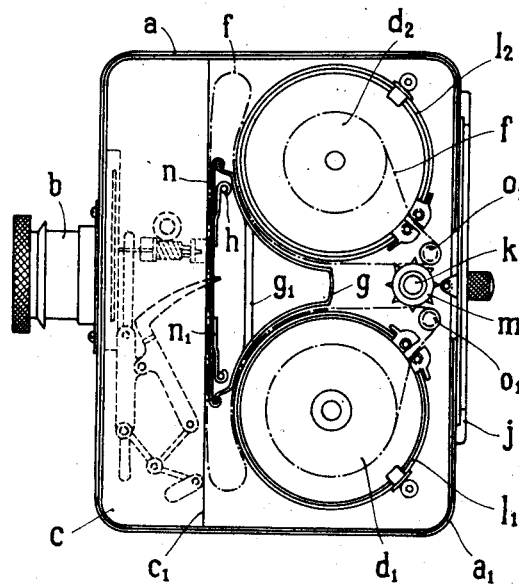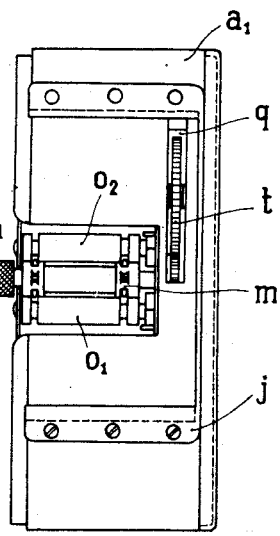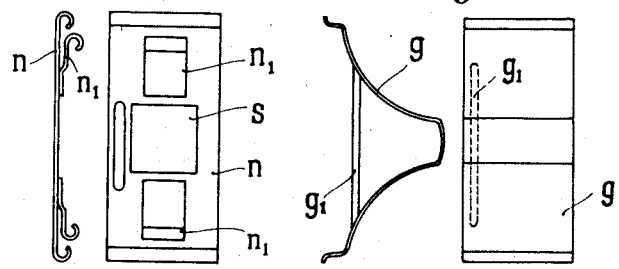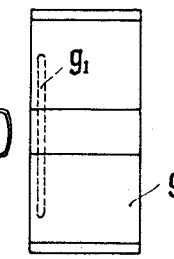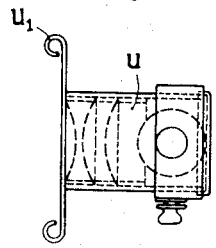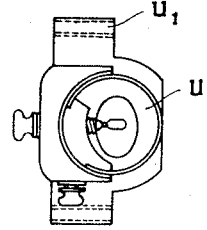

Patented Aug. 10, 1926.

1,595,183

UNITED STATES PATENT OFFICE.

HANS FRIESS, OF BERLIN, GERMANY, ASSIGNOR TO THE FIRM ASKANIA-WERKE AKTIENGESELLSCHAFT VORMALS CENTRALWERKTATT DESSAU UND CARL BAMBERG-FRIEDENAU, OF BERLIN-FRIEDENAU, GERMANY.

CINEMATOGRAPHIC PHOTOGRAPHING AND PROJECTION APPARATUS.

Application filed October 28, 1924, Serial No. 746,403, and in Germany November 1, 1923.

This invention has reference to a cinematographic photographing, reproduction and projecting apparatus which is particularly adapted for private operators or amateurs, and it is one of the important objects of this invention to provide means for the rapid conversion of the device into a projection apparatus. As compared with the kind of apparatus heretofore in use of the nature referred to the invention is particularly distinguished by the fact that the cooperating members of the mechanism of the photographing or reproducing means and of the additional projecting means to be applied thereto may be coupled to each other through a slot of the said photographing or reproducing device.

In further pursuance of my invention the driving mechanism and the guiding means for the film ribbon in the reproduction apparatus are so arranged and constructed that, after the removal of a few easily detachable or removable parts and after the insertion of a projecting lamp the conversion of the apparatus for projecting purposes is finished. By means of the device according to this invention every amateur is enabled to transform his photographing and reproducing apparatus into a projection and stage apparatus in a short time and without considerable additional expense.

Figure 1:
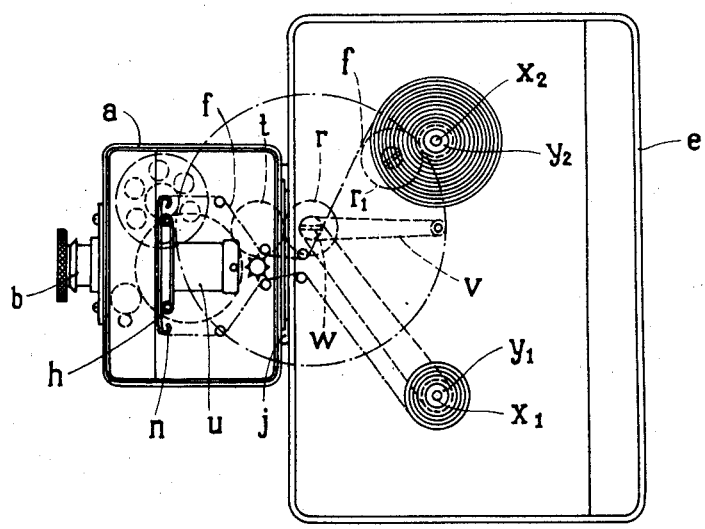
Figure 2:
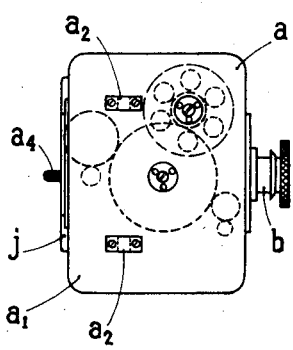
Figure 3:
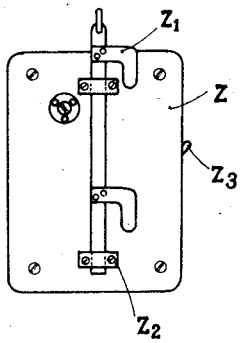
Figure 4:
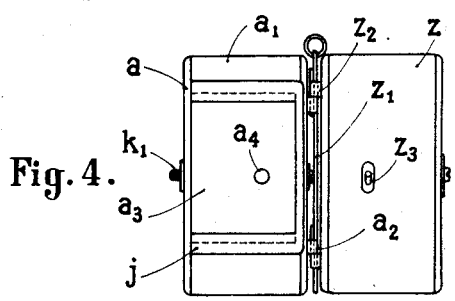

The invention will be more fully described with reference to the accompanying drawing, showing by way of exemplification a form of embodiment of the principles of the invention. In Figure 1 the photographing and reproduction apparatus is shown in the open position with inserted projecting means. Figures 2 to 4 illustrate the combination of the apparatus with a spring actuating mechanism. Figure 5 shows the reproducing apparatus in plan view in the open position. Figure 6 is an elevation of the rear longitudinal side of the reproduction apparatus with the closure slide withdrawn. Figures 7 and 8 represent in plan view and as an elevation respectively the two constituents of the removable film tightening and guiding window; and in Figures 9 and 10 the projecting lamp is shown in plan view and rear view respectively.

In accordance with Figure 1, and Figures 5 and 6 the casing $a$ of the photographing or reproduction apparatus, after the withdrawal of the closing slide, not shown, from the grooved guide $j$ (Figures 1, 2, and 5, 6) may be secured on its narrow side $a^1$ by means of said grooved guide $j$ or by means of any other suitable simple attaching means to the casing $a$ of the complemental device for stage and projecting purposes. A gear wheel $t$ of the operating gear for the film ribbon, provided in the casing $a$ of the photographing or reproduction apparatus protrudes through a slot $q$ of the wall $a_1$ of the casing (Figs. 1 and 6), and is made to be in engagement with a corresponding gear wheel $r$ in the casing of the projecting device $e$, when the two members are united. Upon the shaft of the gear wheel $r$ of the additional projecting device $e$ the crank handle $v$ and the disc $w$ are mounted which latter is in operative connection with the film spool roller $y_1$ on the stud $x_1$. The film $f$ is unwound from the spool $y_2$ mounted on the stud $x_2$ when the film is demonstrated. The driving gear $r_1$ is mounted upon the shaft of the crank handle not shown and serving for the winding back of the demonstrated film from the spool $y_1$ onto the spool $y_2$. (Fig. 1.)

As appears particularly from Figures 5 and 6, the interior of the casing $a$ of the apparatus for its entire length at the side of the objective lens $b$, and for about a third of the width of said casing $a$ is filled by a capsule $c$ which contains the operating means for the closure, shown in dotted lines in Figure 5, and the catch or fastener. Along the middle portion of the inner wall $c_1$ of the said compartment $c$ of the casing the film ribbon $f$ which is wound upon and respectively unwound from the spools $d_1$ and $d_2$ respectively, is guided. The tightening and guiding window $n$, $g$ for the film $f$ is removably secured by means of tightening springs $n_1$ to the vertical fastening stud $h$ in the casing of the reproduction apparatus, so as to be adapted to be withdrawn. The interior section $g$ of the said guiding and tightening window $n$, $g$ is adapted to be conveniently withdrawn and inserted along the cross bar $g_1$ and is provided with two guide flaps which serve for guiding the film during the exposure along a certain portion of the outer walls of the film capsules $l_1$ and $l_2$ (Figures 5, 7 and 8). In place of the section $g$ of the tightening and guiding window an electric projection lamp or the like $u$ may be introduced into the casing of the apparatus and may be secured on the part $n$ of said window by sliding the guide sleeves $u_1$ over the upper ends of the vertical holding pins $h$ (Figs. 1, 9 and 10). The projecting lamp $u$ will then be positioned exactly in front of the apertures of the tightening window $n$ (Figure 7). Besides removing the guide portion $g$ of the window in the utilization of the apparatus for demonstration purposes the film capsules $l_1$, $l_2$ are likewise removed from the casing of the reproduction apparatus (Figure 1.)

With a view of facilitating the union of the photographing and reproduction apparatus with the additional projecting device, and in order to provide for sufficient room for the mounting of the projecting lamp the film driving mechanism is disposed as far away as possible in the vicinity of the rear wall $a_1$ of the casing. The feeding of the film is effected from the crank shaft $k$ which is mounted between the film capsules $l_1$ and $l_2$, and which carries the toothed little driving wheels $m$ for the driving and guiding rollers $o_1$, $o_2$. The proper and safe guiding of the film during the exposure is completed, as already mentioned by the guide sheet metal piece $g$ which is shaped in such a manner that the loops of film ribbon are satisfactorily guided between the outer walls of the film capsules $l_1$ and $l_2$ and the walls of the guide metal sheet $g$ also during pushing or thrusting movements of the film, inasmuch as the shape of the flaps of the guide sheet $g$ correspondingly conforms as exactly and closely as possible to the space formed by the film capsules. (Figure 5).

The crank shaft $k$ of the film driving mechanism, as appears from Figure 5, is provided in the reproduction apparatus with a milled knob or handle $k_1$ (Fig. 6) protruding through the cover of the apparatus, thereby allowing the operation of the mechanism even upon the removal of the crank, thus for instance, for the purpose of inserting the film.

In order to be able to automatically operate the photographing or reproduction apparatus upon exposure in an otherwise well known manner instead of by a crank handle, the casing $z$ in accordance with Figures 2 to 4, belonging to a spring actuating driving mechanism not shown in the drawings may be secured to the apparatus by means of the coupling bar $z_1$ guided in the guides $z_2$ and engageable with the sheet metal eyes $a_2$ of the photographing or reproduction apparatus $a$, when effecting the union of these pieces of apparatus. The release of the spring actuating mechanism is effected by means of the releasing lever $z_3$ projecting from the casing $z$ of the driving mechanism.

In Figures 2, 4 and 5 the casing $a$ of the photographing and reproduction apparatus as required during exposure, is closed by the closing slide $a_3$ of the casing wall $a_1$ inserted in the grooved guide $j$ and to be operated by a handle $a_4$.

While I have shown and described a preferred form of embodiment of my invention it should be understood that in its broad aspects it admits of modifications and changes in accordance with varying conditions of application, and within the scope of the appended claims.

I claim:—

1. In a cinematographic apparatus, a separate photographing and reproduction unit, and a separate projecting unit adjacent thereto, film operating and feeding means in either of said units, inter-engaging gear wheels on said operating and feeding means projecting from one unit into the other unit, and a detachable film operating crank handle in the projecting unit.

2. In a cinematographic apparatus, a separate photographing and reproduction unit, and a separate projecting unit adjacent thereto, film supporting means in either of said units, and inter-engaging film operating and feeding means in the adjacent portions of said units, a film retaining, guiding and tightening sectional window in the reproduction unit, comprising two separately removable sections, one of said sections serving as a guiding means for the film ribbon.

3. In a cinematographic apparatus, in combination, a separate photographing and reproducing unit, a projection unit adjacent thereto, a slidable wall portion in the adjacent walls, inter-engaging film operating means protruding from one unit into the other unit, film supporting means removably mounted in said units, removable film retaining and gripping means in the reproducing unit, and a source of light attachable to said retaining and gripping means.

In testimony whereof I affix my signature.

HANS FRIESS.